United States Patent
Lin et al.

(10) Patent No.: US 10,272,449 B2
(45) Date of Patent: Apr. 30, 2019

(54) PULSE-WIDTH-MODULATED ELECTROMAGNETIC VALVE FOR CONTROLLING FLUID FLOW DIRECTION AND SHOWER HEAD INCORPORATING SAME

(71) Applicant: Fujian Xihe Sanitary Ware Technology Co., Ltd., Nan'an, Fujian (CN)

(72) Inventors: Xiaofa Lin, Nan'an (CN); Xiaoshan Lin, Nan'an (CN); Caibo Gu, Nan'an (CN); Qiqiao Liu, Nan'an (CN); Xiaoqing Deng, Nan'an (CN)

(73) Assignee: Fujian Xihe Sanitary Ware Technology Co., Ltd., Nan'an (CN)

( * ) Notice: Subject to any disclaimer, the term of this patent is extended or adjusted under 35 U.S.C. 154(b) by 0 days.

(21) Appl. No.: 15/107,919

(22) PCT Filed: May 6, 2016

(86) PCT No.: PCT/CN2016/081249
§ 371 (c)(1),
(2) Date: Jun. 24, 2016

(87) PCT Pub. No.: WO2017/185402
PCT Pub. Date: Nov. 2, 2017

(65) Prior Publication Data
US 2018/0193850 A1    Jul. 12, 2018

(30) Foreign Application Priority Data

Apr. 29, 2016  (CN) .......................... 2016 1 0279221

(51) Int. Cl.
*B05B 1/12* (2006.01)
*B05B 1/16* (2006.01)
(Continued)

(52) U.S. Cl.
CPC .............. *B05B 1/1609* (2013.01); *B05B 1/12* (2013.01); *B05B 1/18* (2013.01); *F16K 11/24* (2013.01); *F16K 31/406* (2013.01)

(58) Field of Classification Search
CPC ........ F16K 11/24; F16K 31/40; F16K 31/406; F16K 31/408; F16K 31/42; F16K 31/423;
(Continued)

(56) References Cited

U.S. PATENT DOCUMENTS

2004/0134548 A1* 7/2004 Koyama ............... F16K 11/105
137/881
2004/0195532 A1* 10/2004 Barber ............... F15B 13/0405
251/30.02

* cited by examiner

*Primary Examiner* — Darren W Gorman

(57) ABSTRACT

A valve device for controlling fluid flow direction includes a cap; a valve seat secured to the cap to form a first outlet, a second outlet, and an inlet between the first and second outlets; a stem moveably disposed in a chamber between the first outlet and the second outlet; a pulse-width-modulated electromagnetic valve being adjacent to the first outlet; and a channel disposed between the stem and the pulse-width-modulated electromagnetic valve. In a first operation the pulse-width-modulated electromagnetic valve opens the first outlet and closes the second outlet so that water flows from the opening to the first outlet via the chamber and the channel. In a second operation the pulse-width-modulated electromagnetic valve closes the first outlet and opens the second outlet so that water flows from the opening to the second outlet via the chamber.

5 Claims, 6 Drawing Sheets

(51) Int. Cl.
  *B05B 1/18* (2006.01)
  *F16K 11/24* (2006.01)
  *F16K 31/40* (2006.01)
(58) Field of Classification Search
  CPC ....... F16K 31/426; B05B 1/12; B05B 1/1609;
                      B05B 1/1618; B05B 1/18
  See application file for complete search history.

PULSE-WIDTH-MODULATED ELECTROMAGNETIC VALVE FOR CONTROLLING FLUID FLOW DIRECTION AND SHOWER HEAD INCORPORATING SAME

BACKGROUND OF THE INVENTION

1. Field of the Invention

The invention relates to shower heads and more particularly to a pulse-width-modulated electromagnetic valve for controlling fluid flow direction and a shower head including a valve device incorporating the pulse-width-modulated electromagnetic valve.

2. Description of Related Art

Conventionally, a pulse-width-modulated electromagnetic valve is activated by pulses. Thus, required power is small. This makes the pulse-width-modulated electromagnetic valve applicable in many different fields. For example, it is applicable in sanitation infrastructure such as switching means of a faucet, means for flushing a toilet, etc. However, it can only control the on or off a single fluid path, that is, on or off of the single fluid path. Moreover, power of the pulse-width-modulated electromagnetic valve is supplied from either a transformer or a battery. This is because only the two methods can supply sufficient current to power the pulse-width-modulated electromagnetic valve. However, such power supply methods suffer many drawbacks including difficult wiring, bulky transformer, being not safe, and toxic materials in battery damaging the environment due to improper disposal. Therefore, a hydroelectric generator is considered the best means for supplying current to the pulse-width-modulated electromagnetic valve.

There is a conventional method of switching fluid flow direction from shower head to a bathing faucet or vice versa by using a hydroelectric generator. However, it has many disadvantages. For example, a pulse-width-modulated electromagnetic valve is required for each flow path. That is, there are many pulse-width-modulated electromagnetic valves if many flow paths are installed. And in turn, it can consume more electricity. Unfortunately, the conventional hydroelectric generator cannot supply sufficient electricity to the pulse-width-modulated electromagnetic valves due to its limited power. A modification is that a hydroelectric generator for producing electricity is mounted in the flow system. However, after turning off the water supply or the flow paths being closed due to insufficient electric current the hydroelectric generator is malfunctioned due to no fluid flow. As a result, the fluid flow system is deactivated. Moreover, a lot of spaces are occupied by the pulse-width-modulated electromagnetic valves. In addition, it can increase cost greatly.

In view of above analysis, it is impossible of employing a pulse-width-modulated electromagnetic valve to control fluid flow direction of many fluid paths by means of the conventional art. Thus, the need for improvement still exists.

SUMMARY OF THE INVENTION

It is therefore one object of the invention to provide a pulse-width-modulated electromagnetic valve and a shower head including a valve device incorporating the pulse-width-modulated electromagnetic valve for overcoming the problems associated with the conventional art. The invention is advantageous for being simple in construction, reasonable fluid path arrangement, and being practical. Moreover, the invention can switch between two outlets or among at least three outlets by means of a single pulse-width-modulated electromagnetic valve. In addition, the invention can prevent the fluid paths from being shut off, carry out a smooth switching operation by consuming a minimum amount of electricity. As a result, the drawback of the fluid flow system is deactivated due to insufficient electric current supply of the conventional art is eliminated. The invention is characterized in that the pulse-width-modulated electromagnetic valve is mounted in an end of one of the fluid flow paths, fluid flow direction control is implemented by turning on or off the pulse-width-modulated electromagnetic valve, has a compact size, and has a simple switching operation by pressing either button.

In a first aspect of the invention, there is provided a valve device for controlling fluid flow direction comprising a cap; a valve seat secured to the cap to form a first outlet, a second outlet, and an inlet between the first and second outlets; a stem moveably disposed in a chamber between the first outlet and the second outlet; a pulse-width-modulated electromagnetic valve being adjacent to the first outlet; and a channel disposed between the stem and the pulse-width-modulated electromagnetic valve; wherein in a first operation the pulse-width-modulated electromagnetic valve opens the first outlet and closes the second outlet so that water is configured to flow from the opening to the first outlet via the chamber and the channel; and wherein in a second operation the pulse-width-modulated electromagnetic valve closes the first outlet and opens the second outlet so that water is configured to flow from the opening to the second outlet via the chamber.

Preferably, the invention further comprises a flexible sealing member put on one end of the stem for separating the channel from the chamber, the flexible sealing member including a flexible element facing the channel.

Preferably, the stem includes an intermediate enlargement for blocking or opening the second outlet, a circular flange proximate one end, and a groove between the flange and one end of the stem for receipt of the flexible sealing member; and wherein the flange has an outer diameter greater than that of the enlargement.

Preferably, the stem further comprises a plurality of spaced projections on one end and a plurality of cavities each between two adjacent projections, and wherein the projections are configured to guide a back and forth movement of the stem in the chamber.

Preferably, the invention further comprises a limit member provided in the channel to urge against the stem so as to cause the enlargement of the stem to seal the second outlet.

Preferably, the invention further comprises a V-shaped flexible sealing element between the second outlet and the chamber, the V-shaped flexible sealing element being put on the enlargement and urging against an inner surface of the chamber.

In a second aspect of the invention, there is provided a shower head comprising a valve device, a housing; a hydroelectric generator; a nozzle mount, and an actuator; wherein the pulse-width-modulated electromagnetic valve is mounted in a handle portion of the housing; wherein the actuator is mounted on the housing; wherein the pulse-width-modulated electromagnetic valve is mounted between the housing and the nozzle mount and electrically connected to the hydroelectric generator; wherein the nozzle mount includes an inner nozzle and an outer nozzle connected to the first and second outlets respectively; and wherein in response to activating the actuator the pulse-width-modulated electromagnetic valve is activated to (i) open the first outlet and close the second outlet or (ii) open the second outlet and close the first outlet.

The following advantages are obtained by utilizing the invention:

The invention provides a pulse-width-modulated electromagnetic valve and a shower head including a valve device incorporating the pulse-width-modulated electromagnetic valve for overcoming the problems associated with the conventional art. The invention is advantageous for being simple in construction, reasonable fluid path arrangement, and being practical. Moreover, the invention can switch between two outlets or among at least three outlets by means of a single pulse-width-modulated electromagnetic valve. In addition, the invention can prevent the fluid paths from being shut off, carry out a smooth switching operation by consuming a minimum amount of electricity. As a result, the drawback of the fluid flow system is deactivated due to insufficient electric current supply of the conventional art is eliminated. The invention is characterized in that the pulse-width-modulated electromagnetic valve is mounted in an end of one of the fluid flow paths, fluid flow direction control is implemented by turning on or off the pulse-width-modulated electromagnetic valve, has a compact size, and has a simple switching operation by pressing either button.

The invention employs a pulse-width-modulated electromagnetic valve to switch fluid flow direction between two fluid paths by occupying a minimum space. It has one inlet and two outlets by utilizing the principle of water pressure balance. The invention has the benefits of saving cost, saving about half power, saving about half power in the switching operation, and being operable even when the generated power is insufficient power in comparison with the conventional art. Moreover, only one fluid flow path is open by switching between two fluid paths, thereby preventing the fluid flow system from being deactivated due to insufficient electric current supply.

The invention employs a flexible sealing member put on one end of the stem. The flexible sealing member is flexibly deformed by urging against an inner surface of the chamber. The flexibly deformed sealing member opens the fluid path passing through the chamber and to the contrary, the flexible sealing member closes the fluid path passing through the chamber after returning to its original shape. That is, opening or close of the fluid path can be controlled by deforming the flexible sealing member by changing pressure within the channel. The invention does not suddenly change of flow direction, is more reliable, and saves cost.

The stem includes an intermediate enlargement and a circular flange proximate one end. The stem may move in response to pressure change in the channel. The flange has an outer diameter greater than that of the enlargement. This ensures that the stem can move toward the first outlet when the channel communicates with the atmosphere, thereby rendering a successful switching operation.

The stem further comprises a plurality of spaced projections on one end and a plurality of cavities each between two adjacent projections for allowing water to pass through. Further, the projections can guide a movement of the stem toward the second outlet in a predetermined direction, thereby rendering a successful switching operation.

The invention comprises a limit member provided in the channel to urge against the stem so that the stem is prevented from moving further toward the channel, thereby rendering a successful switching operation.

The invention comprises a V-shaped flexible sealing element between the second outlet and the chamber, the flexible sealing element being put on the enlargement and urging against an inner surface of the chamber, thereby rendering a successful sealing.

A shower head including a valve device incorporating the pulse-width-modulated electromagnetic valve of the invention occupies a minimum space, renders a smooth switching, greatly decreases the cost, and greatly increases the production.

The above and other objects, features and advantages of the invention will become apparent from the following detailed description taken with the accompanying drawings.

DETAILED DESCRIPTION OF THE INVENTION

Figure 1:
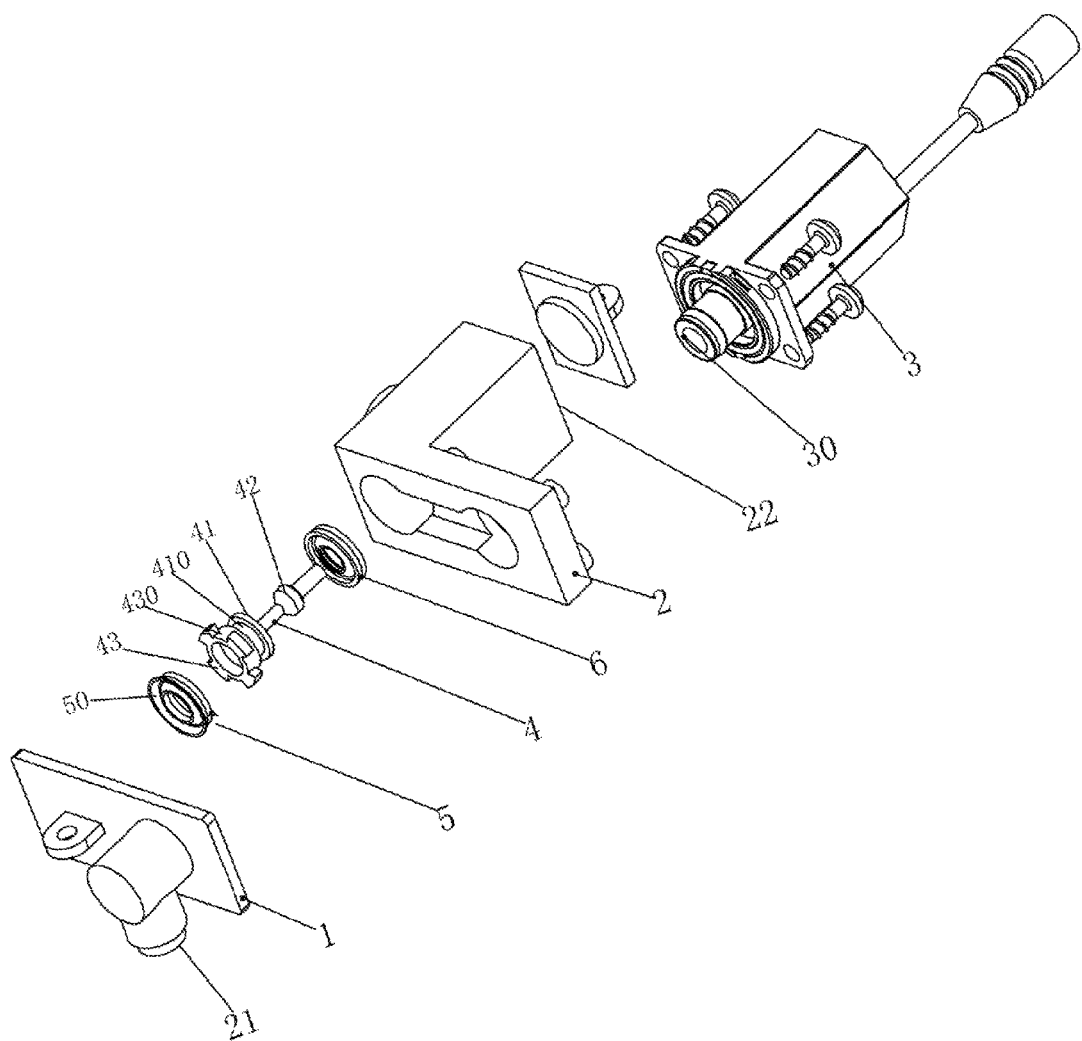
FIG. 1 is an exploded view of a valve device incorporating a pulse-width-modulated electromagnetic valve for controlling fluid flow direction according to the invention.
Figure 2:
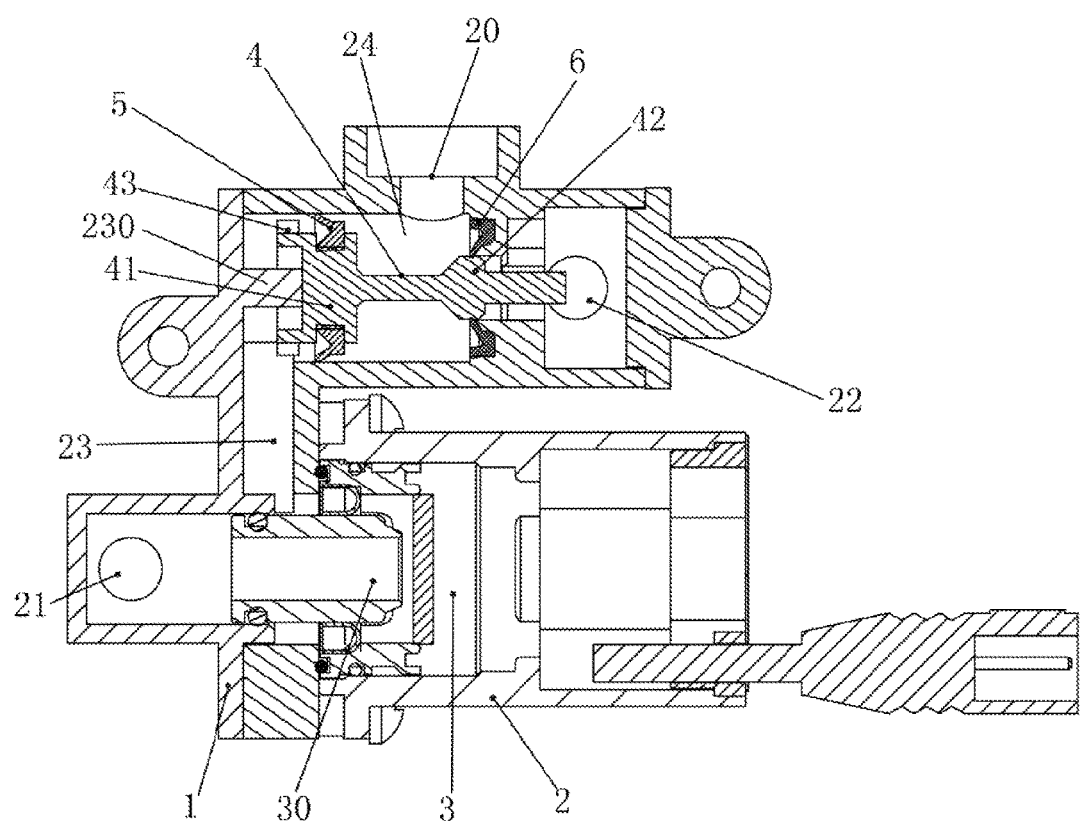
FIG. 2 is a sectional view of the assembled valve device.
Figure 3:
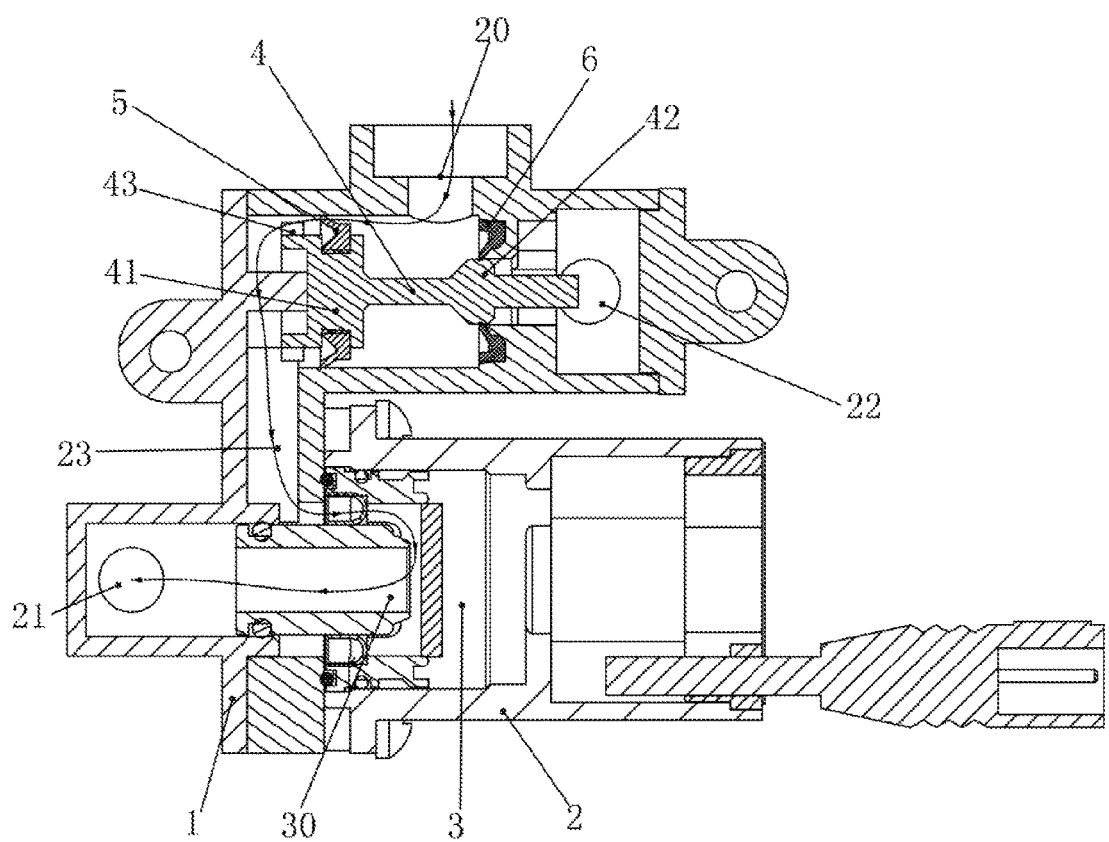
FIG. 3 is a view similar to FIG. 2 showing water flow through the first outlet by pressing one button.
Figure 4:
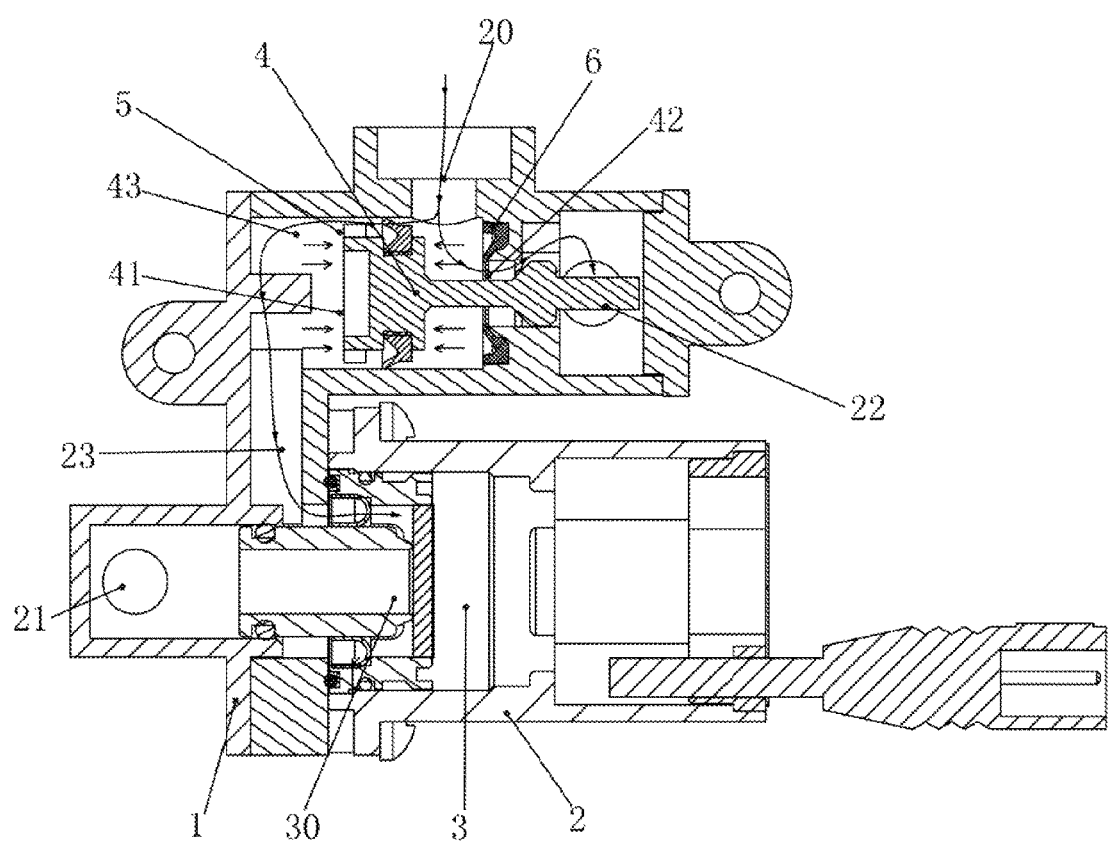
FIG. 4 is a view similar to FIG. 2 showing water flow through the second outlet by pressing the other button.

Referring to FIGS. 1 to 4, a pulse-width-modulated electromagnetic valve 3 for controlling fluid flow direction and a shower head including a valve device incorporating the pulse-width-modulated electromagnetic valve 3 according to the invention comprises the following components as discussed in detail below.

A cap 1, a valve seat 2 and a pulse-width-modulated electromagnetic valve 3 are provided. A first outlet 21 is provided on the cap 1 and an inlet 20 and a second outlet 22 are provided on the valve seat 2. The inlet 20 is between the first outlet 21 and the second outlet 22.

A stem 4 is provided in a chamber 24 which is between the first outlet 21 and the second outlet 22 and communicates therewith. The pulse-width-modulated electromagnetic valve 3 is attached to the valve seat 2 proximate the first outlet 21. A channel 23 is provided between the pulse-width-modulated electromagnetic valve 3 and stem 4. A limit member 230 is provided in the channel 23 which urges against the stem 4 so that an enlargement 42 of the stem 4 may seal the second outlet 22.

A ring-shaped flexible sealing member 5 is put on one end of the stem 4 for separating the channel 23 from the chamber 24. The flexible sealing member 5 has a flexible element 50 facing the channel 23.

In addition to the intermediate enlargement 42, the stem 4 further includes a circular flange 41 proximate one end, and a groove 410 between the flange 41 and one end of the stem 4. The flexible sealing member 5 is put on the groove 410. The flange 41 has an outer diameter greater than that of the enlargement 42.

The first outlet 21 can be open or closed by activating the pulse-width-modulated electromagnetic valve 3 or not. And in turn, water in the channel 23 can flow or not. As a result, the second outlet 22 is closed or open by the stem 4.

Specifically, a plurality of equally spaced projections 43 are formed on one end of the stem 4 and a plurality of cavities 430 each between two adjacent projections 43. The projections 43 serve for guiding a back and forth movement of the stem 4 in the chamber 24.

More specifically, a V-shaped flexible sealing element 6 is put on the enlargement 42 and urged against an inner surface of the chamber 24 for sealing purpose.

Figure 5:
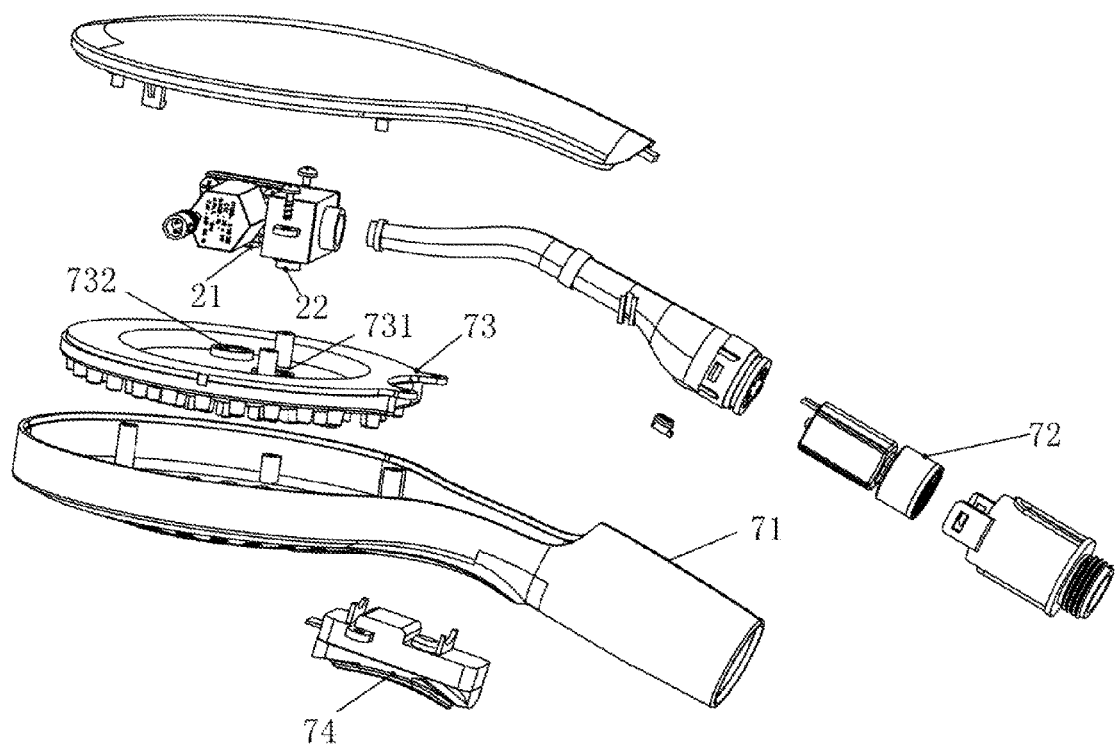
FIG. 5 is an exploded view of a shower head including the valve device.
Figure 6:
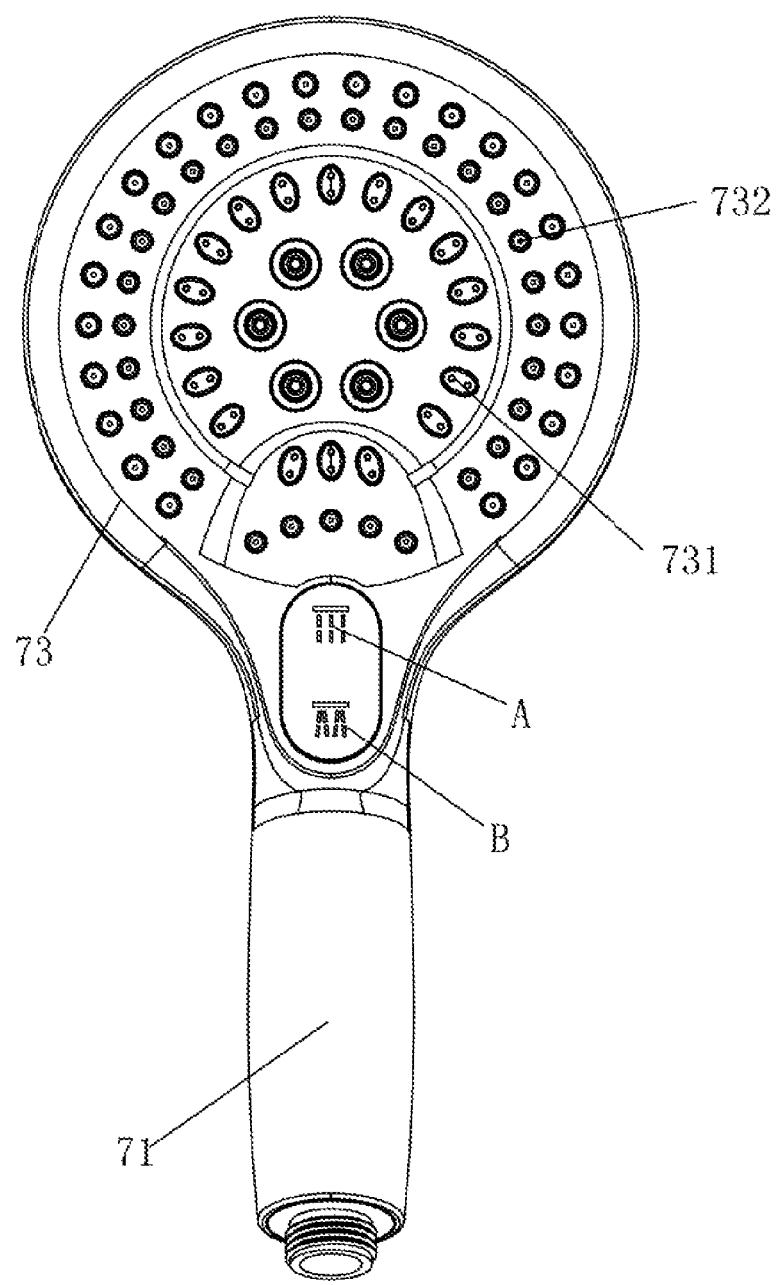
FIG. 6 is a perspective view of the shower head of FIG. 5.

Referring to FIGS. 5 and 6 in conjunction with FIGS. 1 to 4, a shower head including the valve device is shown. The shower head comprises a housing 71, a hydroelectric generator 72, a nozzle mount 73, an actuator 74, a cap 1, a valve seat 2, a pulse-width-modulated electromagnetic valve 3, a stem 4, a flexible sealing member 5 and a V-shaped flexible sealing element 6.

Assembly of the valve device is described in detail below. The pulse-width-modulated electromagnetic valve 3 includes a passageway 30 for water flow, and a waterproof conductor connected to the hydroelectric generator 72. The passageway 30 can be opened or closed by inputting positive or negative pulse signal. In assembly, the pulse-width-modulated electromagnetic valve 3 is secured to the valve seat 2. The passageway 30 communicates with the first outlet 21 so that the first outlet 21 can be open or closed by the pulse-width-modulated electromagnetic valve 3. The stem 4 is mounted in the chamber 24. The flexible sealing member 5 is put on the flange 41 and faces the first outlet 21. The channel 23 is thus formed with the help of the flexible sealing member 5. The channel 23 is located between the flexible sealing member 5 and the first outlet 21. The V-shaped flexible sealing element 6 is mounted in the chamber 24. The other end of the stem 4 passes through the V-shaped flexible sealing element 6 until the V-shaped flexible sealing element 6 is put on the enlargement 42 to block the second outlet 22. The second outlet 22 can be open when the enlargement 42 disengages from the V-shaped flexible sealing element 6. This finishes the assembly of the valve device.

Assembly of the shower head including the valve device is described in detail below. The shower head includes the housing 71, a hydroelectric generator 72, a nozzle mount 73 and an actuator 74 mounted on the housing 71. The actuator 74 is touch based actuator in this embodiment. Alternatively, the actuator 74 is implemented as a remote control, infrared actuator or the like in other embodiments. The hydroelectric generator 72 can produce electricity for consumption of the actuator 74 and the pulse-width-modulated electromagnetic valve 3. A signal is generated in response to a touch and is sent to the pulse-width-modulated electromagnetic valve 3 so that the pulse-width-modulated electromagnetic valve 3 may allow or block the water flow. The first and second outlets 21, 22 are connected to inner and outer nozzles 731, 732 of the nozzle mount 73 respectively. Button A represents water flowing out of the inner nozzles 731 and button B represents water flowing out of the outer nozzles 732. The hydroelectric generator 72 in mounted in the handle element of the housing 71. Finally, the housing 71 and the nozzle mount 73 are assembled. This finishes the assembly of a shower head including the valve device having the pulse-width-modulated electromagnetic valve 3.

As shown in FIGS. 1, 2, 3, 5 and 6, in a first use an individual may press the button A to activate the actuator 74 which in turn sends a positive pulse signal to the pulse-width-modulated electromagnetic valve 3. The passageway 30 is opened by the pulse-width-modulated electromagnetic valve 3 and the first outlet 21 is also open. And in turn, water flows from the open inlet 20 to the chamber 24. The channel 23 communicates with the atmosphere to become a low pressure state due to the opening of the first outlet 21. The second outlet 22 is closed due to the waterproof engagement of the V-shaped flexible sealing element 6 on the enlargement 42. The flexible element 50 of the flexible sealing member 5 is flexibly deformed due to pressurized water. Thus, a gap is formed between the flexible sealing member 5 and the inner surface of the chamber 24. As a result, water flows from the chamber 24 to the inner nozzles 731 via the channel 23, the passageway 30 and the first outlet 21 (see FIG. 3).

As shown in FIGS. 1, 2, 4, 5 and 6, in a second use an individual may press the button B to activate the actuator 74 which in turn sends a negative pulse signal to the pulse-width-modulated electromagnetic valve 3. The passageway 30 is closed by the pulse-width-modulated electromagnetic valve 3 and the first outlet 21 is closed. And in turn, water flows from the open inlet 20 to the chamber 24. The channel 23 does not communicate with the atmosphere due to the closing of the first outlet 21. The channel 23 is in a high pressure state. Water in the channel 23 thus pushes the stem 4 toward and opens the second outlet 22. At the same time, the enlargement 42 disengages from the V-shaped flexible sealing element 6 to communicate the chamber 24 with the second outlet 22. As a result, water flows from the chamber 24 to the outer nozzles 732 via the second outlet 22 (see FIG. 4).

In addition to the shower head, the valve device incorporating the pulse-width-modulated electromagnetic valve can be implemented in a sprinkler, a faucet, a toilet, etc by connecting the outlets of the valve device to inlets of the implemented device. Further, water flow switching can be carried out by activating an actuator which in turn activates the pulse-width-modulated electromagnetic valve.

While the invention has been described in terms of preferred embodiments, those skilled in the art will recognize that the invention can be practiced with modifications within the spirit and scope of the appended claims.

What is claimed is:

1. A valve device for controlling fluid flow direction comprising:
   a cap;
   a valve seat secured to the cap to form a first outlet, a second outlet, and an inlet between the first and second outlets;
   a pulse-width-modulated electromagnetic valve being adjacent to the first outlet;
   a stem moveably disposed in a chamber between the first outlet and the second outlet; and
   a channel disposed between the stem and the pulse-width-modulated electromagnetic valve;
   a flexible sealing member put on an end of the stem for separating the channel from the chamber, the flexible sealing member including a flexible element facing the channel;
   wherein the stem includes an intermediate enlargement for blocking or opening the second outlet, a circular flange proximate the end of the stem and having outer diameter greater than that of the intermediate enlargement, and a groove between the circular flange and the end of the stem for receipt of the flexible sealing member;
   wherein in a first operation the pulse-width-modulated electromagnetic valve opens the first outlet and closes the second outlet so that water is configured to flow from the inlet to the first outlet via the chamber and the channel; and wherein in a second operation the pulse-width-modulated electromagnetic valve closes the first outlet and opens the second outlet so that water is configured to flow from the inlet to the second outlet via the chamber.

2. The valve device of claim 1, wherein the stem further comprises a plurality of spaced projections on the end of the stem and a plurality of cavities each between two adjacent projections, and wherein the projections are configured to guide a back and forth movement of the stem in the chamber.

3. The valve device of claim 1, further comprising a limit member provided in the channel to urge against the stem so as to cause the enlargement of the stem to seal the second outlet.

4. The valve device of claim 1, further comprising a V-shaped flexible sealing element between the second outlet and the chamber, the V-shaped flexible sealing element being put on the enlargement and urging against an inner surface of the chamber.

5. A shower head comprising a valve device as claimed in claim 1, and further comprising:

a housing;

a hydroelectric generator mounted in a handle portion of the housing;

a nozzle mount, and an actuator;

wherein the actuator is mounted on the housing;

wherein the pulse-width-modulated electromagnetic valve is mounted between the housing and the nozzle mount and electrically connected to the hydroelectric generator;

wherein the nozzle mount includes an inner nozzle and an outer nozzle connected to the first and second outlets respectively; and wherein in response to activating the actuator the pulse-width-modulated electromagnetic valve is activated to (i) open the first outlet and close the second outlet or (ii) open the second outlet and close the first outlet.

* * * * *